(12) United States Patent
Kim et al.

(10) Patent No.: US 10,095,459 B2
(45) Date of Patent: Oct. 9, 2018

(54) DISPLAY DRIVING CIRCUIT AND DISPLAY DEVICE INCLUDING THE SAME

(71) Applicant: SAMSUNG ELECTRONICS CO., LTD., Suwon-si, Gyeonggi-do (KR)

(72) Inventors: Yang-Hyo Kim, Gyeonggi-do (KR); Do-Kyung Kim, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 307 days.

(21) Appl. No.: 14/733,357

(22) Filed: Jun. 8, 2015

(65) Prior Publication Data
US 2016/0078833 A1    Mar. 17, 2016

(30) Foreign Application Priority Data
Sep. 11, 2014  (KR) .................. 10-2014-0120356

(51) Int. Cl.
| | |
|---|---|
| G06F 3/14 | (2006.01) |
| G09G 3/20 | (2006.01) |
| G09G 3/3225 | (2016.01) |
| G09G 5/00 | (2006.01) |
| G09G 5/395 | (2006.01) |
| G06F 3/044 | (2006.01) |

(52) U.S. Cl.
CPC .......... G06F 3/1431 (2013.01); G09G 3/2096 (2013.01); G09G 3/3225 (2013.01); G09G 5/005 (2013.01); G09G 5/395 (2013.01); G06F 3/044 (2013.01); G09G 2310/0281 (2013.01); G09G 2310/08 (2013.01); G09G 2370/08 (2013.01)

(58) Field of Classification Search
CPC .............. G09G 5/12; G09G 2300/026; G09G 2360/04; G06F 3/1446
See application file for complete search history.

(56) References Cited

U.S. PATENT DOCUMENTS

| | | | |
|---|---|---|---|
| 6,583,771 B1 * | 6/2003 | Furuhashi | G06F 3/1446 |
| | | | 345/1.1 |
| 7,075,505 B2 | 7/2006 | Sakaguchi et al. | |
| 7,173,611 B2 | 2/2007 | Morita | |
| 7,339,582 B2 | 3/2008 | Akahori | |
| 7,515,126 B2 | 4/2009 | Senda et al. | |
| 7,952,554 B2 | 5/2011 | Awakura et al. | |

(Continued)

FOREIGN PATENT DOCUMENTS

| | | |
|---|---|---|
| KR | 1020040070017 | 8/2004 |
| KR | 1020110122616 | 11/2011 |
| KR | 101095397 | 12/2011 |

*Primary Examiner* — Claire X Pappas
*Assistant Examiner* — Benjamin Casarez
(74) *Attorney, Agent, or Firm* — F. Chau & Associates, LLC

(57) ABSTRACT

A display driving circuit includes a command sync controller, a command pre-buffer and a command register. The command sync controller generates a first sync signal based on an external signal. The command pre-buffer stores a first command. The command register stores the first command provided from the command pre-buffer. The first sync signal is provided both to the command pre-buffer and to an external device of the display driving circuit. The command pre-buffer provides, in response to the first sync signal, the first command stored in the command pre-buffer to the command register.

32 Claims, 8 Drawing Sheets

(56) References Cited

U.S. PATENT DOCUMENTS

| | | | |
|---|---|---|---|
| 8,390,613 B2 | 3/2013 | Park et al. | |
| 2001/0002124 A1* | 5/2001 | Mamiya | G06F 3/1446 345/418 |
| 2002/0093475 A1* | 7/2002 | Hashimoto | G09G 3/3611 345/87 |
| 2004/0263540 A1* | 12/2004 | Ooishi | G09G 3/20 345/690 |
| 2006/0007114 A1* | 1/2006 | Shiraishi | G09G 3/3611 345/103 |
| 2006/0214902 A1* | 9/2006 | Tamura | G06F 3/1431 345/100 |
| 2007/0052857 A1* | 3/2007 | Song | G06F 3/1431 348/565 |
| 2007/0057865 A1* | 3/2007 | Song | G06F 3/1431 345/1.1 |
| 2007/0103590 A1 | 5/2007 | Azar et al. | |
| 2009/0046050 A1 | 2/2009 | Morita | |
| 2009/0237337 A1* | 9/2009 | Nomizo | G09G 3/2096 345/89 |
| 2010/0302214 A1* | 12/2010 | Kim | G09G 3/20 345/204 |
| 2011/0148850 A1* | 6/2011 | Kadota | G09G 3/3685 345/213 |
| 2011/0242412 A1* | 10/2011 | Lee | G06F 3/1438 348/500 |
| 2012/0127149 A1 | 5/2012 | Suzuki | |
| 2012/0229432 A1* | 9/2012 | Ueno | G09G 3/3688 345/204 |
| 2012/0235964 A1* | 9/2012 | Kim | G09G 3/20 345/204 |
| 2012/0256852 A1* | 10/2012 | Van Antwerpen | G06F 3/0416 345/173 |
| 2013/0044089 A1* | 2/2013 | Chang-Chian | G06F 3/1431 345/204 |
| 2013/0120411 A1 | 5/2013 | Swift | |
| 2013/0187832 A1* | 7/2013 | Song | G09G 5/12 345/1.3 |
| 2014/0003564 A1 | 1/2014 | Kammaje | |
| 2014/0019717 A1 | 1/2014 | Yamashita et al. | |
| 2014/0118372 A1* | 5/2014 | Hung | G09G 3/2096 345/532 |
| 2014/0118377 A1* | 5/2014 | Bae | G09G 5/005 345/545 |
| 2015/0371607 A1* | 12/2015 | Holland | G06T 1/20 345/213 |
| 2016/0275893 A1* | 9/2016 | Tanaka | G09G 3/3648 |

* cited by examiner

DISPLAY DRIVING CIRCUIT AND DISPLAY DEVICE INCLUDING THE SAME

CROSS-REFERENCE TO RELATED APPLICATION

This application claims priority under 35 U.S.C. § 119 to Korean Patent Application No. 10-2014-0120356, filed on Sep. 11, 2014 in the Korean Intellectual Property Office, the disclosure of which is incorporated by reference herein in its entirety.

TECHNICAL FIELD

The present inventive concept relates to a display driving circuit and a display device including the same.

DISCUSSION OF RELATED ART

With the development of technology, display panels have been used for various portable, electronic products. In such applications, DDIs (Display Driving ICs) are required to consume less power and occupy less areas without compromising the stability and speed of the DDIs.

SUMMARY

According to an exemplary embodiment of the present inventive concept, a display driving circuit includes a command sync controller, a command pre-buffer and a command register. The command sync controller generates a first sync signal based on an external signal. The command pre-buffer stores a first command. The command register stores the first command provided from the command pre-buffer. The first sync signal is provided both to the command pre-buffer and to an external device of the display driving circuit. The command pre-buffer provides, in response to the first sync signal, the first command stored in the command pre-buffer to the command register.

According to an exemplary embodiment of the present inventive concept, a display driving circuit includes first and second interfaces, a first command pre-buffer and a command sync controller. The first interface circuit communicates with a host. The second interface circuit communicates with another display driving circuit. A first command pre-buffer stores a first command provided through the first interface circuit. The first command controls a first region of a display panel. A command register is coupled to the first command pre-buffer. A command sync controller receives a second sync signal through the second interface circuit and generates a first sync signal based on the second sync signal. The first command pre-buffer provides, in response to the first sync signal, the first command to the command register.

According to an exemplary embodiment of the present inventive concept, a display device includes an application processor, a first display driving circuit and a second display driving circuit. The application processor generates a command for a displaying operation of the display device. The command includes a first command and a second command. The first display driving circuit is coupled to the application processor, storing the first command. The second display driving circuit is coupled to the application processor, storing the second command. The application processor provides, after providing the first command and the second command to the first and second display driving circuits, a completion signal to the first display driving circuit. The first display driving circuit generates a first sync signal in response to the completion signal and provides the first sync signal to the second display driving circuit. The first and second display driving circuits perform the first and second commands in response to the first sync signal.

According to an exemplary embodiment of the present inventive concept, a display device includes display driving circuits and an application processor. The application processor is coupled to the display driving circuits. The application processor provides commands for a displaying operation to the display driving circuits. The application processor provides a completion signal to a first display driving circuit of the display driving circuits if the application processor has completed providing of the commands to the display driving circuits.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF THE EMBODIMENTS

Figure 1:
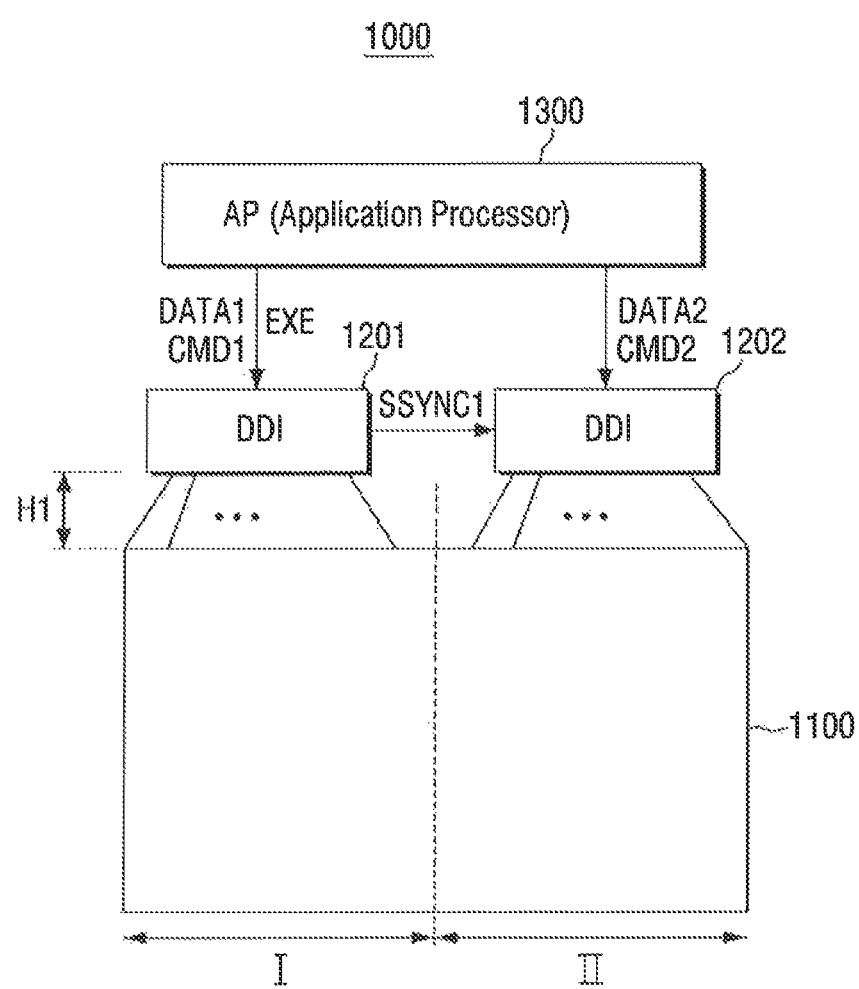
FIG. 1 is a block diagram for a display device according to an exemplary embodiment of the present inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

FIG. 1 is a block diagram for a display device according to an exemplary embodiment of the present inventive concept.

Referring to FIG. 1, a display device 1000 may be an organic light emitting diode display (OLED), a liquid crystal display (LCD), a display panel (DP) device, an electrochromic display (ECD), a digital mirror device (DMD), an actuated mirror device (AMD), a grating light value display (GLV), a plasma display panel (PDP), or an electroluminescent display (ELD).

The display device 1000 includes an application processor (AP) 1300, a plurality of display driving circuits 1201 and 1202, and a display panel 1100.

The display panel 1100 is divided into two regions I and II. For the convenience of description, the display panel 1100 is divided into two regions I and II, and the present inventive concept is not limited thereto. For example, the display panel 1100 may be divided into three or more regions. The display driving circuits 1201 and 1202 serves to control the respective regions of the display panel 1100.

The application processor 1300 provides first video data DATA1 and a first command CMD1 to the first display driving circuit 1201, and provides second video data DATA2 and a second command CMD2 to the second display driving circuit 1202.

The first display driving circuit 1201 controls the first region I of the display panel 1100 based on the first video data DATA1 and the first command CMD1. The second display driving circuit 1202 controls the second region II of the display panel 1100 based on the second video data DATA2 and the second command CMD2. For example, the first display driving circuit 1201 drives, in response to the first command CMD1, both gate lines and data lines of the first region I to display image of the first video data DATA1. In the same manner, the second display driving circuit 1202 drives both gate lines and data lines of the second region II.

The size of the display device 1000 is reduced by using two or more display driving circuits. For example, if the display panel 1100 is driven by a single display driving circuit, the distance between the display driving circuit and the display panel 1100 may be lengthened and thus more space is required to accommodate connections between the single driving circuit and the display panel 1100. If two or more display driving circuits 1201 and 1202 are used, each display driving circuit may placed close to a part of display panel 1100 which is driven by each display driving circuit. Accordingly, the distance H1 between the display driving circuits 1201 and 1202 and the display panel 1100 may be shortened.

In the case where a plurality of display driving circuits 1201 and 1202 are used, it is required for the display driving circuits 1201 and 1202 to operate organically and efficiently with each other. For example, the following case occurs. The first video data DATA1 and the first command CMD1 are related to the first region I, and the second video data DATA2 and the second command CMD2 are related to the second region II. Here, the first command signal CMD1 and the second command signal CMD2 are values to appropriately set the driving circuits according to the display driving environment, and various values are set according to resolution of the panel, the processing method of a video signal, and the like. Further, the first command CMD1 and the second command CMD2 are related to one operation (e.g., screen inversion). On the other hand, in a state where the application processor 1300 provides the first command CMD1 and the second command CMD2 to the first display driving circuit 1201 and the second display driving circuit 1202, respectively, the application processor 1300 may be situated to process other commands having higher priority, such as various interrupters, in addition to display pattern control operations. Accordingly, the first command CMD1 may be first provided to the first display driving circuit 1201, and then the second command CMD2 may be provided to the second display driving circuit 1202 with a time difference. Due to this time difference, an operation that corresponds to the first command CMD1 may be shown in the first region I that is controlled by the first display driving circuit 1201, but an operation that corresponds to the second command CMD2 need not be shown in the second region II that is controlled by the second display driving circuit 1202. That is, divided screens may be shown on the display panel 1100.

Referring back to FIG. 1, the AP 1300 provides a completion signal EXE to the first display driving circuit 1201 when the application processor 1300 has provided the first command CMD1 and the second command CMD2 to the first display driving circuit 1201 and the second display driving circuit 1202, respectively. The first display driving circuit 1201, in response to the completion signal EXE, performs an operation for the first command CMD1 and provides a first sync signal SSYNC1 to the second display driving circuit 1202. The second display driving circuit 1202 receive the first sync signal SSYNC1, and perform an operation for the second command CMD2.

Figure 3:
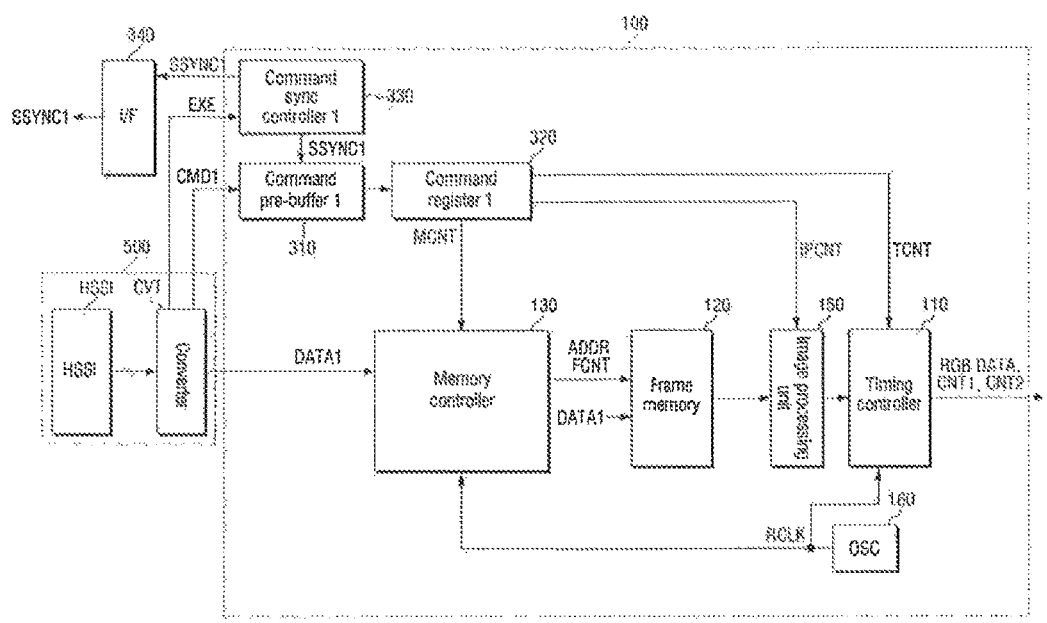
FIG. 3 is a block diagram of a driving controller and an interface circuit of FIG. 2 according to an exemplary embodiment of the present inventive concept.
Figure 4:
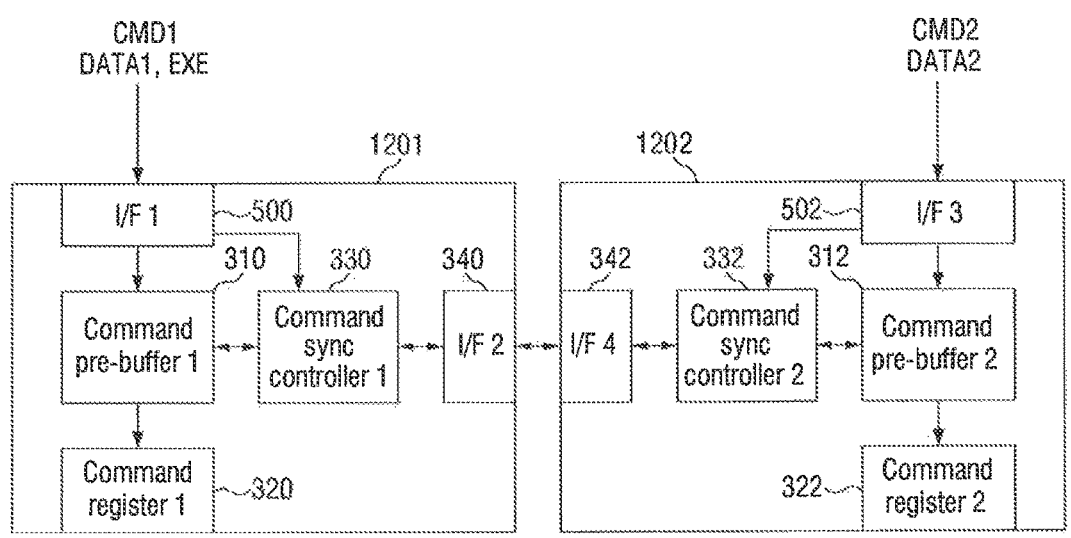
FIG. 4 is a diagram illustrating a sync operation between a first display driving circuit and a second display driving circuit in a display device according to an exemplary embodiment of the present inventive concept.

To implement the above-described operation, the first display driving circuit 1201 includes a first command pre-buffer 310, shown in FIG. 4, that temporarily stores the first command CMD1. The first command CMD1 that is stored in the first command pre-buffer 310 is loaded to a first command register 320, shown in FIG. 4, after the first display driving circuit 1201 receives the completion signal EXE. Similarly, the second display driving circuit 1202 includes a second command pre-buffer 312, shown in FIG. 4, that temporarily stores the second command CMD2. The second command CMD2 that is stored in the second command pre-buffer 312 is loaded to a second command register 322, shown in FIG. 4 after the second display driving circuit 1202 receives the first sync signal SSYNC1. The descriptions thereof will be made later with reference to FIGS. 3 to 6.

Figure 2:
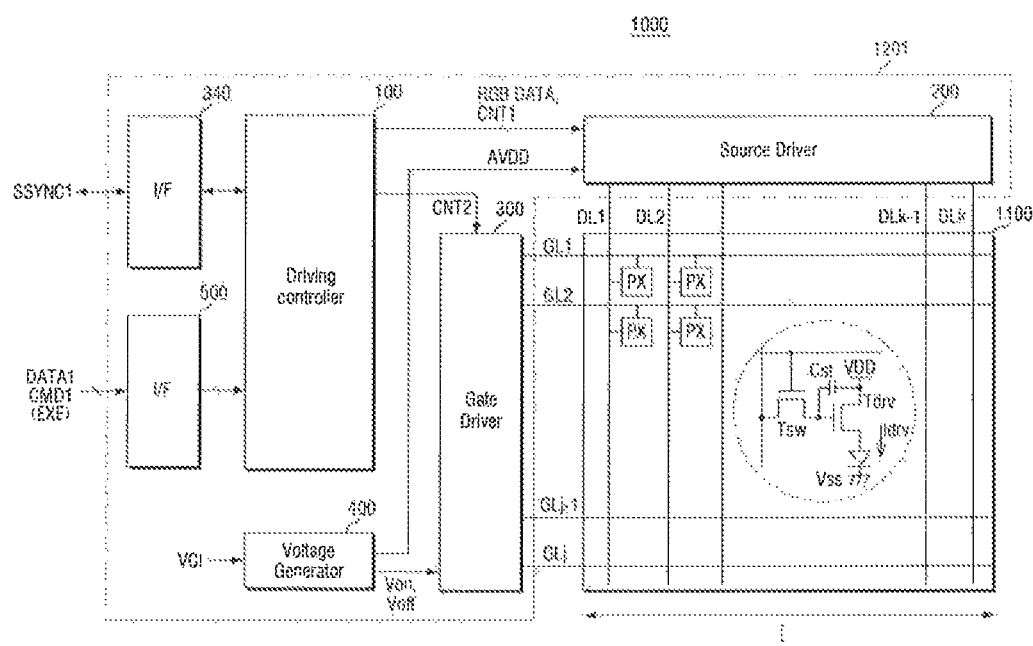
FIG. 2 is a block diagram of a first display driving circuit and a first region of a display panel of FIG. 1 according to an exemplary embodiment of the present inventive concept.

FIG. 2 is a block diagram of a first display driving circuit and a first region of a display panel of FIG. 1 according to an exemplary embodiment of the present inventive concept. Here, the display panel may be an organic light emitting diode panel, for example. The second display driving circuit may have substantially the same configuration as the configuration of the first display driving circuit.

Referring to FIG. 2, the display panel 1100 includes a plurality of gate lines GL1 to GLj that transfer scan signals in a row direction, a plurality of data lines DL1 to DLk arranged in a direction in which that cross the gate lines to transfer data signals in a column direction, and a plurality of pixels PX arranged in a region in which the gate lines GL1 to GLj and the data lines DL1 to DLk cross each other.

If the plurality of gate lines GL1 to GLj are selected sequentially, gradation voltages Vg are applied to the pixels PX connected to the selected gate lines through the plurality of data lines DL1 to DLk.

Each of the pixels PX include a switching transistor Tsw, a driving transistor Tdrv, a storage capacitor Cst, and an organic light emitting diode D. The gate line GL and the data line DL are connected to the gate electrode and the source electrode of the switching transistor Tsw. The drain electrode of the switching transistor Tsw and a power supply voltage VDD are connected to the gate terminal and the source terminal of the driving transistor Tdrv. The drain terminal of the driving transistor Tdrv is connected to the anode of the organic light emitting diode D. In this pixel structure, if the gate line GL is selected, the switching transistor Tsw is turned on to apply a gradation voltage that is provided through the data line DL to the gate terminal of the driving transistor Tdrv, and driving current Idrv according to the voltage difference between the driving power supply voltage VDD and the gradation voltage flows through the organic light emitting diode D, so that the organic light emitting diode D emits light to achieve the display operation.

The display driving circuit 1201 further includes a driving controller 100, a source driver 200, a gate driver 300, a voltage generator 400, a first interface circuit 500 and a second interface circuit 340.

The driving controller 100 receives the first video data DATA1 and the first command CMD1 from the outside, for example, a host of a system on which the display device 1000 is mounted, and provides control signals CNT1 and CNT2 and pixel data RGB DATA that are required for the operation of the display device to the source driver 200 and the gate driver 300. The driving controller 100 includes a timing controller, an image processing unit, a frame memory, a memory controller, a command pre-buffer, a command register, and a command sync controller. The detailed configuration of the driving controller 100 will be described later using FIG. 3.

The source driver 200 converts the pixel data RGB DATA that is digital data applied from the driving controller 100 into gradation voltages, and outputs the gradation voltages to the data lines DL1 to DLk of the panel 1100. The gate driver 300 scans sequentially the gate lines GL1 to GLj of the panel 1100. The gate driver 300 activates the selected gate lines by applying a gate-on voltage Von to the selected gate lines, and the source driver 200 outputs gradation voltages that correspond to the pixels that are connected to the activated gate lines. Accordingly, the panel 1100 displays an image in the unit of a horizontal line, that is, row by row.

The voltage generator 400 receives a power supply voltage VCI from the outside, and generates voltages AVDD, Von, and Voff that are required in the source driver 200 and the gate driver 300.

The first interface circuit 500 communicates with the host (e.g., application processor). The first interface circuit 500 receives the first video data DATA and the first command CMD1 that are applied in parallel or in series from the host, and provides the first video data DATA1 and the first command CMD1 to the driving controller 100. The first video data DATA1 and the first command CMD1 may be transmitted from the host of the system on which the display device 1000 is mounted. The first interface circuit 500 receives the first video data DATA1 and the first command CMD1 according to the interface method that corresponds to the transmission method of the host. For example, the interface method may be one of RGB interface, CPU interface, SPI (Service Provider Interface), MDDI (Mobile Display Digital Interface), and MIPI (Mobile Industry Processor Interface) methods.

The second interface circuit 340 communicates with the second display driving circuit 1202. The second interface circuit 340 provides the first sync signal SSYNC1 that is generated from the driving controller 100 to the second display driving circuit 1202. The first sync signal SSYNC1 is a signal that is generated in response to the completion signal EXE. The second interface circuit 340 may be an interface having a different type from the type of the first interface circuit 500. The second interface circuit 340 may be, for example, a SPI (Serial Peripheral Interface) or an I2C (Inter Integrated Circuit), but is not limited thereto.

FIG. 3 is a block diagram of a driving controller and an interface circuit of FIG. 2 according to an exemplary embodiment of the present inventive concept.

Referring to FIG. 3, the first interface circuit 500 includes an interface HSSI and a converter CVT.

The interface HSSI operates using a high-speed serial interface method. For example, the interface may be a MIPI (Mobile Industry Processor Interface) that receives data at high speed through a plurality of input/output terminals, but is not limited thereto. The interface may operate using various interface methods. The first video data DATA1 and the first command CMD1 that are received through the interface HSSI are applied to the converter CVT. The first video data DATA1 and the first command CMD1 may be received together according to the interface method regardless of the kind of data. The first command CMD1 may include a completion signal EXE (e.g., in the case of the MIPI method). In this case, the first command CMD1 and the completion signal EXE are transferred, through the converter CVT, to the driving controller 100. For example, the first command CMD1 is transferred to the first command pre-buffer 310 through the converter CVT. The first video data DATA1 is transferred, through the converter CVT, to the frame memory 120 and the memory controller 130. The completion signal EXE is transferred to a first command sync controller 330.

The driving controller 100 includes a timing controller 110, a frame memory 120, a memory controller 130, a first command pre-buffer 310, a first command sync controller 330, a first command register 320, an image processor 150, and an oscillator 160.

The first command pre-buffer 310 temporarily stores the first command CMD1. The first command sync controller 330 generates the first sync signal SSYNC1 based on the completion signal EXE that is an external signal. The first sync signal SSYNC1 is provided to the first command pre-buffer 310 and the second interface circuit 340. The first command pre-buffer 310 loads the first command CMD1 stored therein to the first command register 320 in response to the first sync signal SSYNC1. For example, after receiving the completion signal EXE, the first command pre-buffer 310 loads the first command CMD1 to the first command register 320. Further, after receiving the first sync signal SSYNC1, the first command pre-buffer 310 may load the first command CMD1 to the first command register 320 in synchronization with another internal sync signal (e.g., vertical sync signal Vsync). For example, after the commands CMD1 and CMD2 are transferred to (or stored in) the corresponding display driving circuits 1201 and 1202, the first command CMD1 is loaded to the first command register 320. Here, the first command signal CMD1 includes control information for operating the driving circuit according to the display driving environment. For example, the first command signal CMD1 may include various control information according to resolution of the panel, the processing method of a video signal, and the like. The first command register 320 analyzes the first command signal CMD1, and generates signals MCNT, IPCNT, and TCNT for controlling the memory controller 130, the image processor 150, and the timing controller 110. Alternatively, the first command register may store values to generate signals MCNT, IPCNT, and TCNT for controlling the memory controller 130, the image processor 150, and the timing controller 110. In this case, the command signals includes the values to generate the signals MCNT, IPCNT, and TCNT.

The timing controller 110 generates control signals CNT1 and CNT2 including timing signals for controlling the source driver 200 and the gate driver 300 of FIG. 2.

The frame memory 120 temporarily stores the first video data DATA of one frame to be displayed on the panel 1100, and outputs the first video data DATA to display the first video data DATA1 on the panel 1100. The frame memory 120 may be formed of a graphic RAM, and a volatile memory, such as SRAM (Static Random Access Memory), but is not limited thereto. Various kinds of memories may be used as the frame memory 120.

The memory controller 130 controls the overall operation of the frame memory 120, and for example, controls addresses and timing of a write operation and a scan operation that are performed in the frame memory 120.

The image processor 150 converts the video data DATA1 that is received from the frame memory 120 into values that is appropriate to the environment of the panel 1100 (in FIG. 1) based on the control signal IPCNT, and transfers the converted values to the timing controller 110.

The oscillator 160 generates and provides a reference clock RCLK to the timing controller 110 and the memory controller 130.

FIG. 4 is a diagram illustrating a sync operation between a first display driving circuit and a second display driving circuit in a display device according to an exemplary embodiment of the present inventive concept.

Referring to FIG. 4, the first display driving circuit 1201 includes a first interface circuit 500, a first command pre-buffer 310, a first command sync controller 330, a first command register 320, and a second interface circuit 340.

The second display driving circuit 1202 includes a third interface circuit 502, a second command pre-buffer 312, a second command sync controller 332, a second command register 322, and a fourth interface circuit 342.

The first display driving circuit 1201 receives the first command CMD1 and the first video data DATA1 from the host (or application processor) through the first interface circuit 500. The second display driving circuit 1202 receives the second command CMD2 and the second data DATA2 from the host (or application processor) through the third interface circuit 502. Here, the first command CMD1 and the second command CMD2 are commands related to one operation. For example, the first command CMD1 and the second command CMD2 are paired to complete a displaying operation. The first command CMD1 may control the displaying operation for half of a display panel, and the second command CMD2 may control the displaying operation for the remaining half of the display panel. The first command CMD1 is stored in the first command pre-buffer 310. The second command CMD2 is stored in the second command pre-buffer 312.

After the first command CMD1 and the second command CMD2 are stored in the first display driving circuit 1201 and the second display driving circuit 1202, respectively, the host (or application processor) provides the completion signal EXE to the first display driving circuit 1201.

After the first display driving circuit 1201 provides the first sync signal SSYNC1 to the second display driving circuit 1202 in response to the completion signal EXE, the first display driving circuit 1201 and the second display driving circuit 1202 performs operations that correspond to the first command CMD1 and the second command CMD2, respectively.

For example, the first command sync controller 330 receives the completion signal EXE, generates and provides the first sync signal SSYNC1 to the first command pre-buffer 310 and the second interface circuit 340. The first command CMD1 stored in the first command pre-buffer 340 is transferred to the first command register 320 in response to the first sync signal SSYNC1. The second interface circuit 340 transfers the first sync signal SSYNC1 to the fourth interface circuit 342. The second command sync controller 332 receives the first sync signal SSYNC1, and generates the second sync signal SSYNC2. The second command CMD2 stored in the second command pre-buffer 312 is transferred to the second command register 322 in response to the second sync signal SSYNC2. Accordingly, the first command register 320 and the second command register 322 analyze the first command CMD1 and the second command CMD2, and generate the control signals MCNT, IPCNT, and TCNT, respectively.

In doing so, the first display driving circuit 1201 and the second display driving circuit 1202 simultaneously performs one displaying operation when the AP 1300 of FIG. 1 performs a command having higher priority than the displaying operation. Accordingly, the display panel 1100 does not show the divided screens.

In an exemplary embodiment, the first display driving circuit 1201 and the second display driving circuit 1202 may receive the completion signal EXE. In this case, the first display driving circuit 1201 may transmit a first sync signal SSYNC1 to the second display driving circuit 1202 based on the completion signal EXE, and the second display driving circuit 1202 may transmit a second sync signal SSYNC2 to the first display driving circuit 1201 based on the completion signal EXE. Accordingly, the first command pre-buffer 310 of the first display driving circuit 1201 may load, in response to the first sync signal SSYNC1 and the second sync signal SSYNC2, the first command CMD1 to the first command register 320. The second command pre-buffer 312 of the second display driving circuit 1202 may load, in response to the first sync signal SSYNC1 and the second sync signal SSYNC2, the second command CMD2 to the second command register 322.

Figure 5:
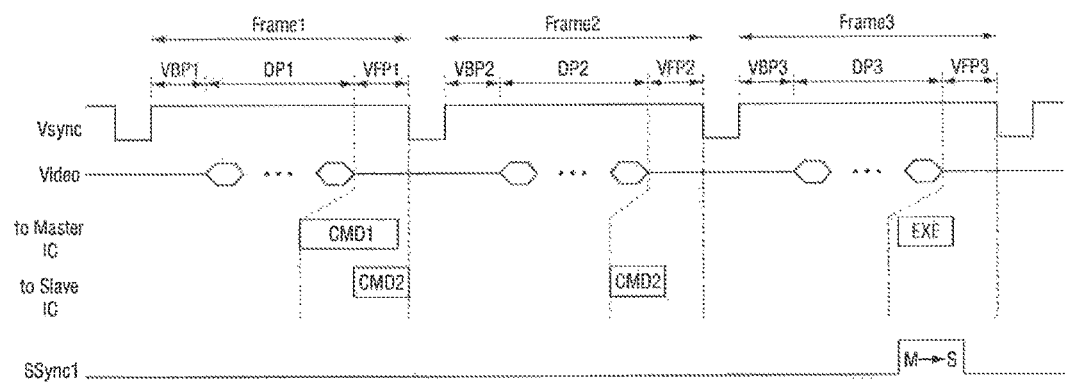
FIG. 5 is a timing diagram of a sync operation between a first display driving circuit and a second display driving circuit in a display device according to an exemplary embodiment of the present inventive concept.

FIG. 5 is a timing diagram of a sync operation between a first display driving circuit and a second display driving circuit in a display device according to an exemplary embodiment of the present inventive concept.

Referring to FIG. 5, an image is displayed on the panel 1100 (in FIG. 1) based on the vertical sync signal Vsync and the horizontal sync signal. For the convenience of description, three frames Frame 1 to Frame 3 are shown in FIG. 5. Each frame corresponds to a period from the rising edge of the vertical sync signal Vsync to the next rising edge thereof.

On the other hand, the respective frames Frame1 to Frame3 may include a vertical back porch period, a main display period and a vertical front porch period. For example, the first frame Frame 1 includes a vertical back porch period VBP1, a main display period DP1, and a vertical front porch period VFP1, respectively.

In the main display periods DP1, DP2, and DP3, gradation voltages that correspond to the pixel data are applied to the panel 1100 (in FIG. 1) to display an image thereon.

In the vertical back porch periods VBP1, VBP2, and VBP3 and the vertical front porch periods VFP1, VFP2, and VFP3, the gradation voltages are not applied, but the displayed image is maintained in the main display period.

Further, through the vertical front porch periods VFP1, VFP2, and VFP3, the first command CMD1 is inputted to the first display driving circuit (hereinafter called a "master IC") 1201, and the second command CMD2 is inputted to the second display driving circuit (hereinafter called a "slave IC") 1202. As illustrated, the first command CMD1 is completely transmitted in the first vertical front porch period VFP1, but the second command CMD2 is transmitted through the first vertical front porch period VFP1 and the second vertical front porch period VFP2 due to the interruption in the AP 1300 of FIG. 1. After the second command CMD2 is completely transmitted, the completion signal EXE is inputted to the first display driving circuit 1201 in the third vertical front porch period VFP3. The first display driving circuit 1201, in response to the completion signal EXE, generates the first sync signal SSYNC1. The first sync signal SSYNC1 is transferred to the second display driving circuit 1202. Accordingly, the first display driving circuit 1201 and the second display driving circuit 1202 may simultaneously perform, in response to the first sync signal SSYNC1, one operation after the third frame Frame3.

Figure 6:
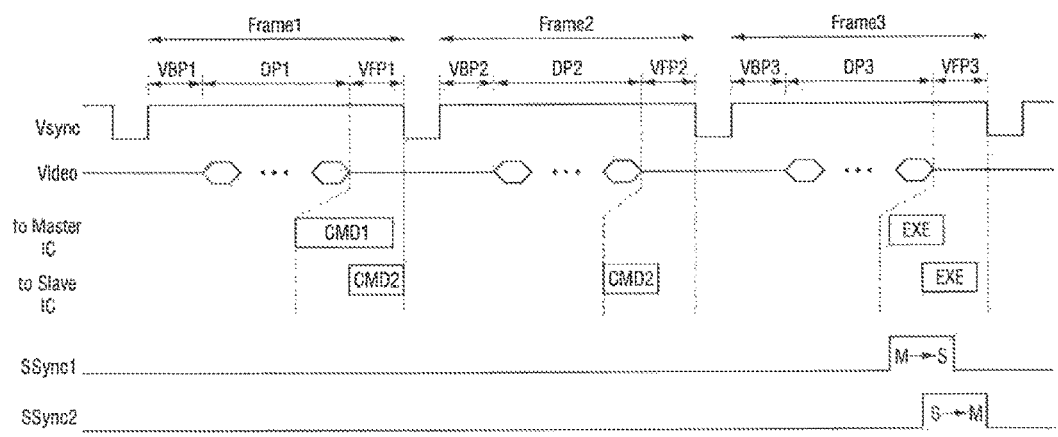
FIG. 6 is a timing diagram illustrating a sync operation between a first display driving circuit and a second display driving circuit in a display device according to an exemplary embodiment of the present inventive concept.

FIG. 6 is a timing diagram illustrating a sync operation between a first display driving circuit and a second display driving circuit in a display device according to an exemplary embodiment of the present inventive concept. For the convenience of description, the following description will focus on differences of FIG. 6 from the timing diagram of FIG. 5.

Referring to FIG. 6, in the first vertical front porch period VFP1, the first command CMD1 is inputted to the first display driving circuit (hereinafter called a "master IC") 1201, and in the first and second vertical front porch period VFP1 and VFP2, the second command CMD2 is inputted to the second display driving circuit (hereinafter called a "slave IC") 1202. The first command CMD1 is completely transmitted in the first vertical front porch period VFP1, but the second command CMD2 is transmitted through the first vertical front porch period VFP1 and the second vertical front porch period VFP2. After the second command CMD2 is completely transmitted, the completion signal EXE is inputted to the first display driving circuit 1201 and the second display driving circuit 1202 in the third vertical front porch period VFP3. The first display driving circuit 1201 generates the first sync signal SSYNC1. The first sync signal SSYNC1 is transferred to the second display driving circuit 1202. In the same manner, the second display driving circuit 1202 generates the second sync signal SSYNC2. The second sync signal SSYNC2 is transferred to the first display driving circuit 1201. Accordingly, the first display driving circuit 1201 and the second display driving circuit 1202 may simultaneously perform, in response to the first and second sync signals SSYNC1 and SSYNC2, one operation after the third frame Frame3.

The inventive concept is not limited thereto, and the first and second commands CMD1 and CMD2 may be inputted any time within the frame, without being limited to the vertical front porch periods VFP1, VFP2, and VFP3.

Figure 7:
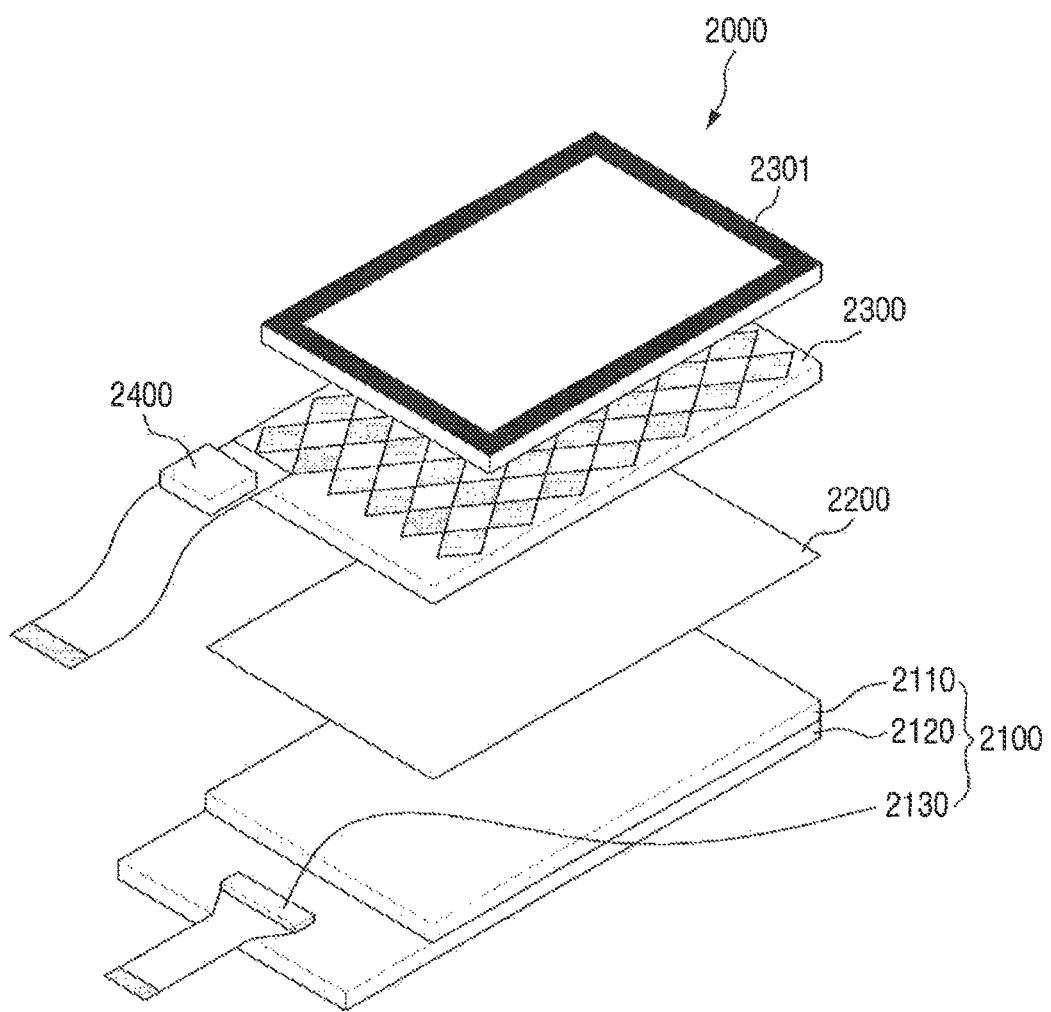
FIG. 7 is a view illustrating a display module according to an embodiment of the present inventive concept.

FIG. 7 is a view illustrating a display module according to an embodiment of the present inventive concept.

Referring to FIG. 7, a display module 2000 is provided with a display device 2100, a polarizing plate 2200, and a window glass 2301. The display device 2100 is provided with a display panel 2110, a printed circuit board 2120, and a display driving chip 2130.

The window glass 2301 is generally formed of a material, such as acryl or tempered glass, to protect the display module 2000 from an external impact or scratch due to repeated touch. The polarizing plate 2200 is provided for better optical characteristics of the display panel 2110. The display panel 2110 is formed by patterning a transparent electrode on the printed circuit board 2120. The display panel 2110 includes a plurality of pixel cells to display an image. According to an exemplary embodiment, the display panel 2110 may be an organic light emitting diode panel. Each pixel cell includes an organic light emitting diode that emits light of which intensity depends on a current flow amount, but is not limited thereto. The display panel 2110 includes various kinds of display elements. For example, the display panel 2110 may be one of a liquid crystal display (LCD), an electrochromic display (ECD), a digital mirror device (DMD), an actuated mirror device (AMD), a grating light value display (GLV), a plasma display panel (PDP), an electroluminescent display (ELD), and a light emitting diode (LED) display, and a vacuum fluorescent display (VFD).

The display driving chip 2130 may include a display driving circuit according to an exemplary embodiment. In this case, the display driving chip 2130 is illustrated as one chip, but is not limited thereto. A plurality of driving chips may be mounted as the display driving chip 2130. Further, the display driving chip 2130 may be mounted on the printed circuit board 2120 of a glass material in a COG (Chip On Glass) form. The present inventive concept is not limited thereto, and the display driving chip 2130 may be mounted in various forms, such as COF (Chip On Film) and COB (Chip On Board).

The display module 2000 further includes a touch panel 2300 and a touch controller 2400. The touch panel 2300 may be formed by patterning a transparent electrode, such as ITO (Indium Tin Oxide) on a glass substrate or a PET (Polyethylene Terephthalate) film. A touch controller 2400 senses the occurrence of a touch on the touch panel 2300, calculates touch coordinates, and transfers the calculated touch coordinates to the host (not illustrated). The touch controller 2400 may be integrated into one semiconductor chip together with the display driving chip 2130.

Figure 8:
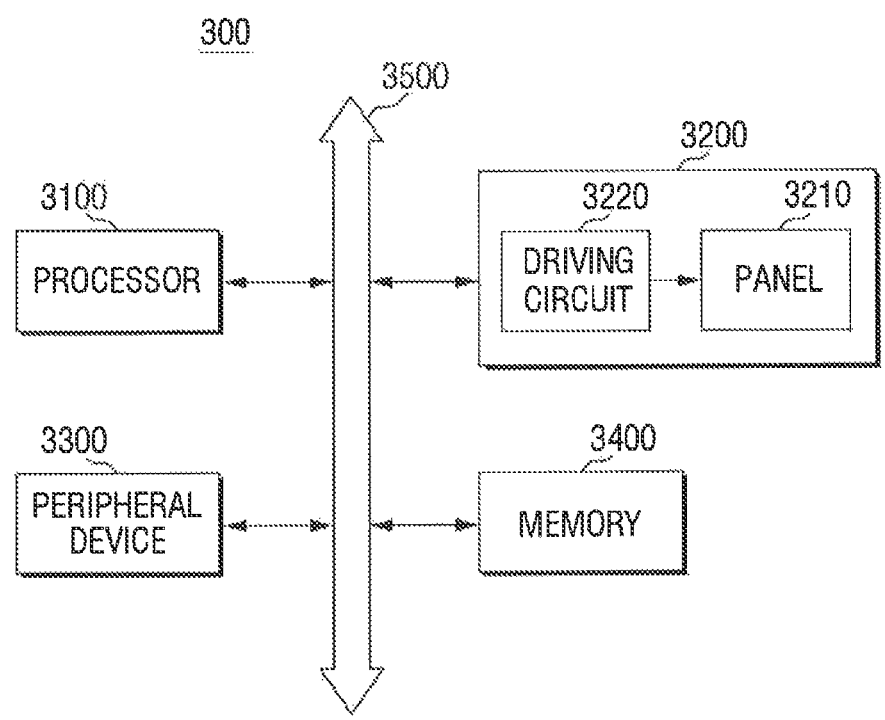
FIG. 8 is a diagram of a display system according to an exemplary embodiment of the present inventive concept.

FIG. 8 is a diagram of a display system according to an exemplary embodiment of the present inventive concept.

Referring to FIG. 8, a display system 3000 includes a processor 3100, a display device 3200, a peripheral device 3300, and a memory 340 which are electrically connected to a system bus 3500.

The processor 3100 controls input/output of data of the peripheral device 3300, the memory 3400, and the display device 3200, and performs image processing of video data that is transmitted between the devices as described above.

The display device 3200 includes a panel 3210 and a driving circuit 3220. The display device 3200 stores video data applied through the system bus 3500 in the frame memory included in the driving circuit 3220, and displays the video data on the panel 3210. The display device 3200 may be a display device according to an exemplary embodiment. Accordingly, the display device 3200 operates in asynchronous with the processor 3100, and thus the processor 3100 may operate an operation having higher priority, performing a displaying operation.

The peripheral device 3300 is a device that converts a moving image or a still image into an electrical signal, such as a camera, a scanner, or a web cam. Video data that is acquired through the peripheral device 3300 is stored in the memory 3400 or is displayed on the panel of the display device 3200 in real time.

The memory 3400 includes a volatile memory, such as a dynamic random access memory (DRAM), and/or a non-volatile memory, such as a flash memory. The memory 3400 may be composed of a DRAM, a phase change random-access memory (PRAM), a magnetoresistive random-access memory (MRAM), a resistive random-access memory (ReRAM), a NOR flash memory, a NAND flash memory, or a fusion flash memory (e.g., memory in which a SRAM buffer, a NAND flash memory, and a NOR interface logic are combined). The memory 3400 stores video data that is acquired from the peripheral device 3300 or a video signal that is processed by the processor 3100.

The display system 3000 may be provided in a mobile electronic product, such as a smart phone, but is not limited thereto. The display system 3000 may be provided in various kinds of electronic products that display images.

Figure 9:
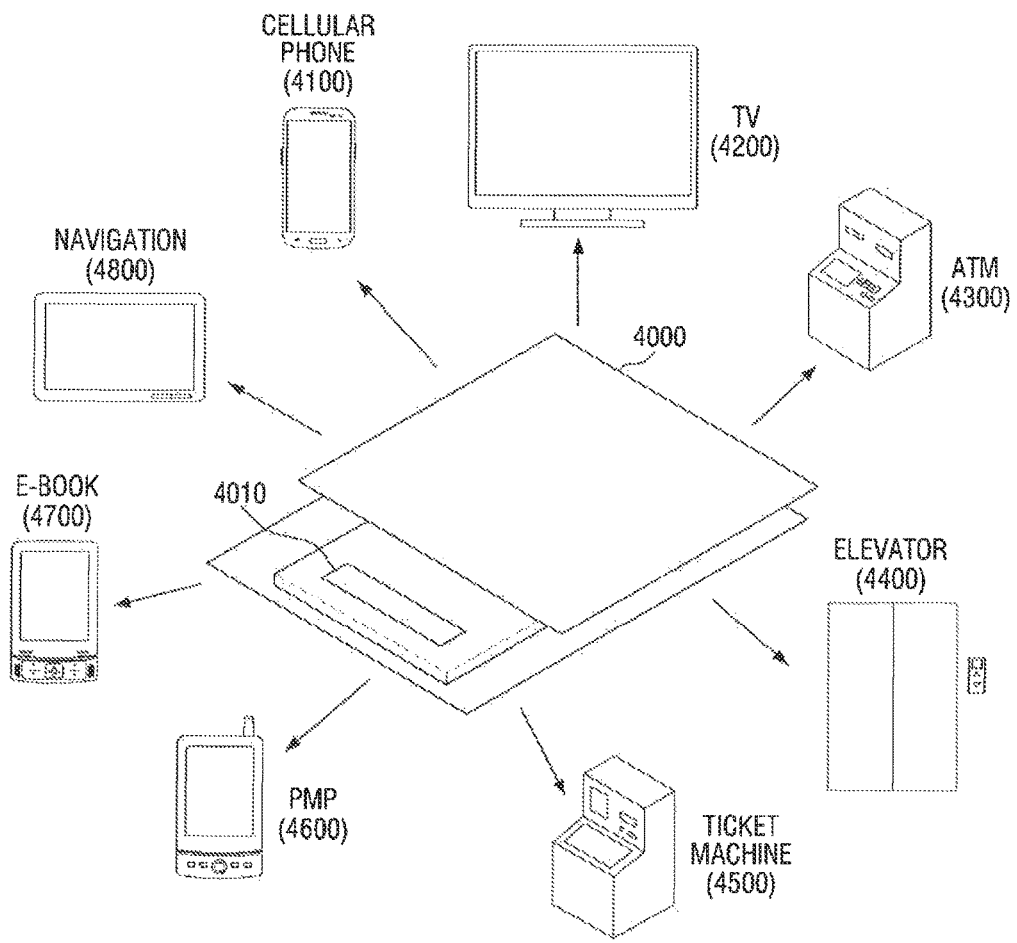
FIG. 9 is a diagram illustrating various electronic products including a display device according to an exemplary embodiment of the present inventive concept.

FIG. 9 is a diagram illustrating various electronic products including a display device according to an exemplary embodiment of the present inventive concept.

A display device 4000 according to an exemplary embodiment of the present inventive concept may be adopted in various electronic products. The display device 4000 may be adopted in a cellular phone 4100, or may be widely used in a TV 4200, an ATM 4300 that automatically executes as proxy for cash receipts and payments of a bank, an elevator 4400, a ticket machine 4500 that is used in the subway, a PMP 4600, an e-book 4700, or navigation 4800.

The display device 4000 according to an exemplary embodiment of the present inventive concept operates in asynchronous with a system processor. Accordingly, a driving burden of the processor is reduced, the processor may operate with low power consumption and at high speed, and thus the performance of the electronic product may be increased.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

What is claimed is:

1. A display driving circuit comprising:
   a command sync controller configured to generate a first sync signal based on an external signal;
   a command pre-buffer configured to store a first command; and
   a command register configured to store the first command provided from the command pre-buffer and to execute the first command,
   wherein the first sync signal is provided both to the command pre-buffer and to an external device of the display driving circuit, and wherein the command pre-buffer is configured to provide, in response to the first sync signal, the first command stored in the command pre-buffer to the command register, and
   wherein the external signal is a completion signal that is provided from a host, and the completion signal indicates that a second command that is related to the first command has been provided to another display driving circuit.

2. The display driving circuit of claim 1, wherein the first command controls a first region of a display panel, and the second command controls a second region of the display panel, and the first command and the second command are paired for one displaying operation.

3. The display driving circuit of claim 1, wherein the command pre-buffer is further configured to receive a second sync signal from another display driving circuit, and provide the first command to the command register in further response to the second sync signal.

4. The display driving circuit of claim 1, wherein the first sync signal is provided to another display driving circuit.

5. The display driving circuit of claim 4, further comprising:
   a first interface configured to receive the external signal and the first command; and
   a second interface configured to provide the first sync signal to another display driving circuit.

6. The display driving circuit of claim 1, wherein the first command is provided through a vertical front porch period.

7. The display driving circuit of claim 1, wherein each display driving circuit further comprises:
   a memory controller coupled to the command register;
   an image processing unit coupled to the command register; and
   a timing controller coupled to the command register, wherein in response to the first command, the command register provides control signals to an image processor, a timing controller, and a memory controller, respectively.

8. A display driving circuit comprising:
   a command sync controller configured to generate a first sync signal based on an external signal;
   a command pre-buffer configured to store a first command; and
   a command register configured to store the first command provided from the command pre-buffer and to execute the first command,
   wherein the first sync signal is provided both to the command pre-buffer and to an external device of the display driving circuit, and wherein the command pre-buffer is configured to provide, in response to the first sync signal, the first command stored in the command pre-buffer to the command register; and
   wherein the external signal is a second sync signal which is provided from another display driving circuit that controls a second region of a display panel.

9. A display driving circuit comprising:
   a command sync controller configured to generate a first sync signal based on an external signal;
   a command pre-buffer configured to store a first command; and
   a command register configured to store the first command provided from the command pre-buffer and to execute the first command,
   wherein the first sync signal is provided both to the command pre-buffer and to an external device of the display driving circuit, and wherein the command pre-buffer is configured to provide, in response to receiving the first sync signal, the first command stored in the command pre-buffer to the command register,
   wherein the command pre-buffer is further configured to provide the first command to the command register in response to an internal sync signal after receiving the first sync signal.

10. The display driving circuit of claim 9, wherein the internal sync signal is a vertical sync signal.

11. A display driving circuit comprising:
    a first interface circuit configured to communicate with a host;

a second interface circuit configured to communicate with another display driving circuit;

a first command pre-buffer configured to store a first command provided through the first interface circuit, the first command controlling a first region of a display panel;

a command register coupled to the first command pre-buffer; and a command sync controller configured to receive a second sync signal through the second interface circuit and generate a first sync signal based on the second sync signal, wherein the first command pre-buffer is configured to provide, in response to the first sync signal, the first command to the command register, and the command register is configured to perform the first command and transmit control signals.

12. The display driving circuit of claim 11, wherein the another display driving circuit further comprises a second command pre-buffer configured to store a second command for control a second region of the display panel, and the first command and the second command are paired for one displaying operation.

13. The display driving circuit of claim 12, wherein the second sync signal is a signal indicating that the second command has been stored in the second command pre-buffer.

14. The display driving circuit of claim 11, wherein the first command pre-buffer is further configured to provide the first command to the command register in response to an internal sync signal after receiving the first sync signal.

15. The display driving circuit of claim 14, wherein the first sync signal is a vertical sync signal.

16. The display driving circuit of claim 11, wherein the first command is provided through a vertical front porch period.

17. The display driving circuit of claim 11, further comprising an image processor connected to the command register, and wherein the command register transmits the control signals to at least the image processor.

18. A display device comprising:

an application processor configured to generate a command for a displaying operation of the display device, wherein the command includes a first command and a second command;

a first display driving circuit coupled to the application processor and including a first command pre-buffer configured to store the first command;

a first command register coupled to the first command pre-buffer; and a second display driving circuit coupled to the application processor and configured to store the second command, wherein the application processor is further configured to provide, after providing the first command and the second command to the first and second display driving circuits, a completion signal to the first display driving circuit, wherein the first display driving circuit is further configured to generate a first sync signal in response to the completion signal and provide the first sync signal to the second display driving circuit, and wherein the first and second display driving circuits are further configured to perform the first and second commands in response to the first sync signal, wherein in response to the first sync signal, the first command register is configured to perform the first command and transmit control signals.

19. The display device of claim 18, wherein the first display driving circuit comprises:

a first command sync controller configured to generate the first sync signal based on the completion signal.

20. The display device of claim 18, wherein the second display driving circuit comprises:

a second command pre-buffer is configured to store the second command; and a second command sync controller is configured to receive the first sync signal and generate a second sync signal, wherein the second command pre-buffer is further configured to provide, in response to the second sync signal, the second command stored in the second command pre-buffer to a second command register.

21. The display device of claim 18, wherein the application processor is further configured to provide the completion signal to the second display driving circuit, and the second display driving circuit is configured to generate, in response to the completion signal, a second sync signal and provide the second sync signal to the first display driving circuit.

22. The display device of claim 18, wherein the first sync signal is directly provided from the first display driving circuit to the second display driving circuit without going through the application processor.

23. The display device of claim 18, wherein the first command and the second command are provided through a vertical front porch period.

24. The display device of claim 18, wherein the first command controls a first region of a display panel, and the second command controls a second region of the display panel.

25. The display device of claim 18, wherein the control signals are transmitted to an image processor, a timing controller, and a memory controller, respectively.

26. A display device, comprising:

a plurality of display driving circuits; and an application processor coupled to the display driving circuits and configured to:

provide a plurality of commands for a displaying operation to the plurality of display driving circuits; and provide a completion signal to a first display driving circuit of the plurality of display driving circuits if the application processor has completed providing of the plurality of commands to the plurality of display driving circuits, wherein at least the first display driving circuit generates control signals in response to performance of at least one of the plurality of commands, and the first display driving circuit includes a command pre-buffer, a command register coupled to the command pre-buffer and a command sync controller configured to receive the completion signal and generate a first sync signal, wherein in response to the first sync signal, the command register of the first display driving circuit is configured to perform a first command of the plurality of commands and transmit the control signals.

27. The display device of claim 26, wherein each of the plurality of display driving circuits includes a respective command pre-buffer and a respective command register coupled to the respective command pre-buffer.

28. The display device of claim 27, wherein the first sync signal is provided to the respective command pre-buffer of the first display driving circuit and externally outputted.

29. The display device of claim 27, wherein the first sync signal is provided to the respective command pre-buffer of each display driving circuit so that each command stored in the respective command pre-buffer of each display driving circuit is provided, in response to the first sync signal, to the respective command register of each display driving circuit.

30. The display device of claim 27, each display driving circuit further comprising:
   a memory controller coupled to the command register;
   an image processing unit coupled to the command register; and
   a timing controller coupled to the command register.

31. The display device of claim 26, wherein the first display driving circuit transmits control signals to an image processor, a timing controller, and a memory controller, respectively.

32. The display device of claim 26, further comprising:
   a display panel having the plurality of display driving circuits connected thereto to drive the display panel, each of the plurality of display driving circuits being arranged to define a distance between the display panel and each of the plurality of display driving circuits,
   wherein the display panel includes a plurality of display regions, and each one of the plurality of display driving circuits is configured to drive a respective display region of the plurality of display regions, and each one of the plurality of display driving circuits is arranged to correspond with the respective display region that it drives to define the distance between the display panel and each of the plurality of display driving circuits, and
   wherein the distance between each of the plurality of display driving circuits and the display panel decreases as a quantity of the plurality of display driving circuits increases.

* * * * *